US011223124B2

(12) United States Patent
Harper

(10) Patent No.: US 11,223,124 B2
(45) Date of Patent: Jan. 11, 2022

(54) VARIABLE GROUND PLANE TUNING COMPENSATION

(71) Applicant: Microsoft Technology Licensing, LLC, Redmond, WA (US)

(72) Inventor: Marc Harper, Snohomish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 36 days.

(21) Appl. No.: 16/450,424

(22) Filed: Jun. 24, 2019

(65) Prior Publication Data

US 2020/0358176 A1    Nov. 12, 2020

Related U.S. Application Data

(60) Provisional application No. 62/846,395, filed on May 10, 2019.

(51) Int. Cl.
*H01Q 1/24* (2006.01)
*H01Q 1/48* (2006.01)
(Continued)

(52) U.S. Cl.
CPC .............. *H01Q 1/48* (2013.01); *H01Q 1/243* (2013.01); *H01Q 1/38* (2013.01); *H04B 1/0458* (2013.01)

(58) Field of Classification Search
CPC ...... H01Q 1/22; H01Q 1/2258; H01Q 1/2266; H01Q 1/241; H01Q 1/242; H01Q 1/243;
(Continued)

(56) References Cited

U.S. PATENT DOCUMENTS 4,761,621 A    8/1988  Kane et al.
5,834,989 A   11/1998  Romerein et al.
(Continued)

FOREIGN PATENT DOCUMENTS

EP    1814192 A1    8/2007

OTHER PUBLICATIONS

"International Search Report and Written Opinion Issued in PCT Application No. PCT/US20/027875", dated Jul. 24, 2020, 14 Pages.
(Continued)

*Primary Examiner* — Andrea Lindgren Baltzell
*Assistant Examiner* — Patrick R Holecek
(74) *Attorney, Agent, or Firm* — Holzer Patel Drennan

(57) ABSTRACT

A communications device provides variable ground plane tuning compensation. The communications device includes a radiofrequency antenna configured to generate an electromagnetic field, a ground plane assembly electrically coupled to the radiofrequency antenna, and a variable impedance compensation network electrically connected to the ground plane assembly. The ground plane assembly is configurable between a first physical configuration and a second physical configuration. Each physical configuration presents a different ground plane assembly impedance to the electromagnetic field of the radiofrequency antenna. The variable impedance compensation network provides a compensation impedance for each physical configuration of the ground plane assembly. The compensation impedance of the variable impedance compensation network and the ground plane assembly impedance of each of the physical configurations combine to tune mutual electromagnetic coupling between the ground plane assembly and the radiofrequency antenna to satisfy a predetermined operational tuning condition for the communications device in each physical configuration.

20 Claims, 8 Drawing Sheets

(51) Int. Cl.
*H04B 1/04* (2006.01)
*H01Q 1/38* (2006.01)

(58) Field of Classification Search
CPC .. H01Q 1/38; H01Q 1/48; H01Q 1/50; H01Q 1/52; H04B 1/0458
See application file for complete search history.

(56) References Cited

U.S. PATENT DOCUMENTS

| | | | |
|---|---|---|---|
| 7,667,663 B2 | 2/2010 | Hsiao et al. | |
| 8,145,144 B2 * | 3/2012 | Krenz | H04M 1/72478 455/90.3 |
| 8,256,685 B2 | 9/2012 | Chen et al. | |
| 8,441,404 B2 | 5/2013 | Chiang et al. | |
| 8,593,360 B2 | 11/2013 | Baliarda et al. | |
| 9,147,929 B2 | 9/2015 | Anguera et al. | |
| 2008/0048925 A1 * | 2/2008 | Soutome | H01Q 1/48 343/846 |
| 2008/0246674 A1 | 10/2008 | Rutfors et al. | |
| 2009/0224984 A1 | 9/2009 | Nysen et al. | |
| 2009/0325655 A1 | 12/2009 | Sato et al. | |
| 2012/0038520 A1 | 2/2012 | Cornwell | |
| 2012/0280860 A1 | 11/2012 | Kamgaing et al. | |
| 2019/0103656 A1 | 4/2019 | Shi et al. | |

OTHER PUBLICATIONS

Kabacik, et al., "Broadening the Bandwidth in Terminal Antennas by Tuning the Coupling between the Element and Its Ground", In Proceedings of IEEE Antennas and Propagation Society International Symposium, Jul. 3, 2005, pp. 557-560.

Picher, et al., "Concentrated Ground Plane Booster Antenna Technology for Multiband Operation in Handset Devices", In Journal of Radioengineering, vol. 23, Issue 4, Dec. 2014, pp. 1061-1070.

* cited by examiner

VARIABLE GROUND PLANE TUNING COMPENSATION

CROSS-REFERENCE TO RELATED APPLICATIONS

The present application claims priority to U.S. Provisional Patent Application 62/846,395 entitled "Variable Ground Plane Tuning Compensation" and filed May 10, 2019, which is specifically incorporated herein by reference for all that is discloses and teaches.

BACKGROUND

A foldable device can have multiple (e.g., two) ground plane portions that present different mutual coupling relationships between each other and between the ground plane portions and an associated antenna as the positioning of the components changes with respect to each other.

SUMMARY

The described technology provides a communications device providing variable ground plane tuning compensation. The communications device includes a radiofrequency antenna configured to generate an electromagnetic field, a ground plane assembly electrically coupled to the radiofrequency antenna, the ground plane assembly being configurable between a first physical configuration and a second physical configuration, each of the physical configurations presenting a ground plane assembly impedance to the electromagnetic field of the radiofrequency antenna, and a variable impedance compensation network electrically connected to the ground plane assembly. The variable impedance compensation network provides a compensation impedance for each of the physical configurations of the ground plane assembly. The compensation impedance of the variable impedance compensation network and the ground plane assembly impedance of each of the physical configurations of the ground plane assembly combine to tune mutual electromagnetic coupling between the ground plane assembly and the radiofrequency antenna to satisfy a predetermined operational tuning condition for the communications device in each of the physical configurations.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

DETAILED DESCRIPTIONS

Foldable communication mobile devices present challenges to antenna performance because relative orientation and proximity changes between the folding sections can dramatically alter mutual coupling between the conductive components. For example, a foldable mobile communications device (e.g., a computing device with communication capabilities) may have multiple ground planes that can influence antenna operations. For example, one implementation of a foldable mobile communications device can be assembled from two halves of the device, each half including a ground plane. When the device is adjusted between an unfolded position and a folded position, the ground plane halves move relative to each other, changing their mutual coupling. Furthermore, if one device half includes a radiofrequency antenna, then a folding movement changes the mutual coupling between the radiofrequency antenna and the other ground plane, although likely to a lesser extent. Nevertheless, as these various couplings change, the tuning of the radiofrequency antenna changes and can decrease antenna performance at certain relevant frequencies. The described technology provides tuning compensation that accounts for the changes in mutual coupling between multiple ground planes and between a moving ground plane and a radiofrequency antenna of a folding mobile communications device.

Figure 1:
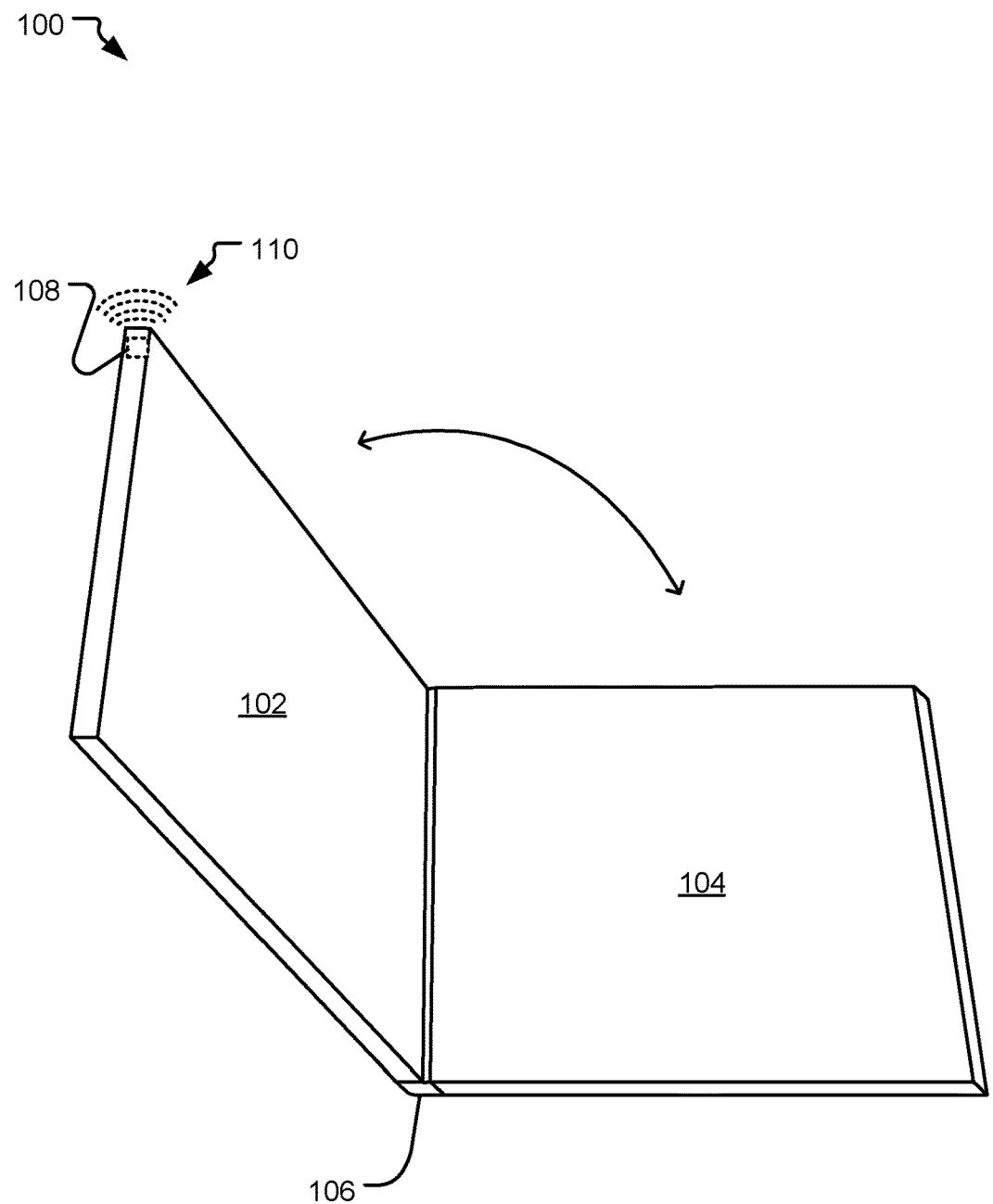
FIG. 1 illustrates an example communication device in which two device sections move relative to each other.

FIG. 1 illustrates an example communication device 100 in which two device sections 102 and 104 move relative to each other. In the illustrated implementation, the two device sections 102 and 104 fold about a hinge 106, and each device section 102 and 104 includes a ground plane. In other implementations, the device sections 102 and 104 can move relative to each other by other movements, such as a sliding relationship or a cantilevered relationship. Movement of the device sections 102 and 104 cause relative movements of their respective ground planes, which changes the impedance characteristics of the device sections 102 and 104. Other factors can influence the impedance characteristics of the device section 102 and 104, including changes in electrical connections, power, and external coupling effects.

The device section 102 further includes a radiofrequency antenna 108 that is configured to generate an electromagnetic field 110 as a radiofrequency transmission signal in a transmitting mode and to receive a radiofrequency transmission signal in a receiving mode. The radiofrequency antenna 108 is tuned to transmit and receive radiofrequency signals within a tuned frequency range. However, the tuning of the radiofrequency antenna 108 is influenced by the ground plane assembly impedance presented to the radiofrequency antenna 108 by the ground planes of the device sections 102 and 104. Accordingly, as the ground plane assembly impedance of the device sections 102 and 104 changes, the radiofrequency antenna 108 can become detuned to the frequency range of interest.

The communications device 100 includes a variable compensation impedance network (not shown) that presents a variable compensation impedance to maintain the tuning of the radiofrequency antenna 108 as the ground plane assembly impedance of the communications device 100 changes. As such, when the communications device 100 changes between a first physical configuration (e.g., open or flat) to a second physical configuration, the variable compensation impedance network presents a variable compensation impedance to tune the radiofrequency antenna 108 for operation within a predesignated frequency range (e.g., between 500 MHz and 1.25 GHz or other bandwidths of interest) without changing the size of the radiofrequency antenna 108. Accordingly, tuning (depending on ground plane assembly impedance) of the radiofrequency antenna 108 can be accomplished during operation by adjusting the variable compensation impedance.

Figure 2A:
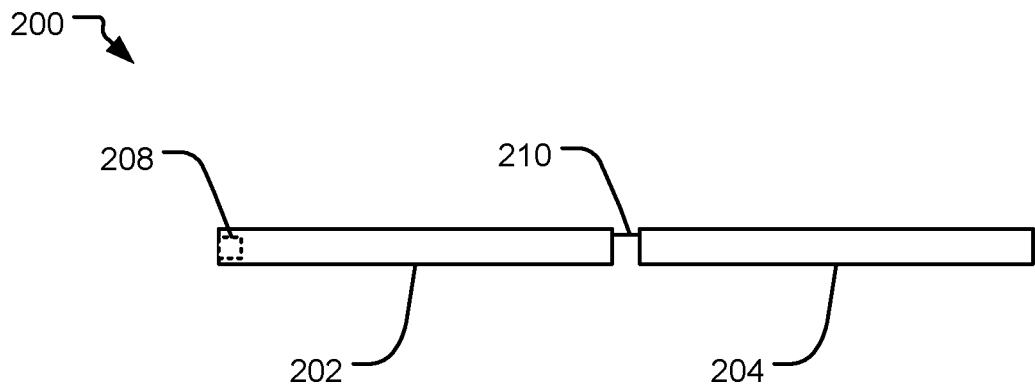
FIG. 2A illustrates an edge view of ground planes of an example communication device in a flat configuration.
Figure 2B:
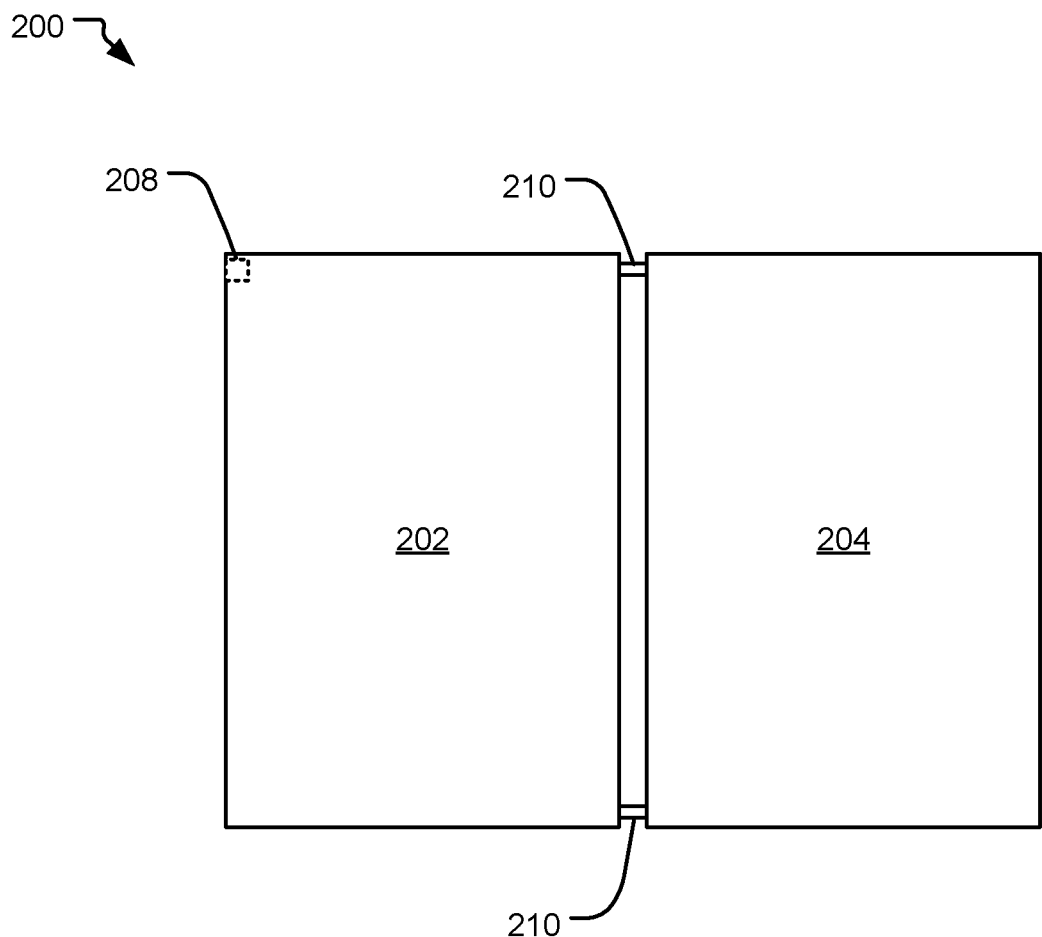
FIG. 2B illustrates a plan view of ground planes of an example communication device in a flat configuration.

FIG. 2A illustrates an edge view of ground planes 202 and 204 of an example communication device 200 in a flat configuration. FIG. 2B illustrates a plan view of ground planes 202 and 204 of an example communication device 200 in a flat configuration. In the illustrated views, the ground planes 202 and 204 represent a ground plane assembly, although other physical configurations of one or more ground planes can represent alternative ground plane assemblies. In both views, a radiofrequency antenna 208 is shown at a corner of and electrically coupled to the ground planes 202 via an electrical connection, although specific placement of the radiofrequency antenna 208 may vary.

In both views, the mutual electromagnetic coupling between the ground planes 202 and 204 and the radiofrequency antenna 208 is influenced by the mutual electromagnetic coupling between the ground planes 202 and 204 themselves (e.g., which changes as the relative positions and/or orientations of the ground planes 202 and 204 changes). Changes in the mutual electromagnetic coupling between the ground planes 202 and 204 change the ground plane assembly impedance presented to the radiofrequency antenna 208 and therefore change the tuning of the radiofrequency antenna 208.

A variable compensation impedance network 210 connects the ground planes 202 and 204 and compensates for changes in the ground plane assembly impedance presented to the radiofrequency antenna 208. For example, the flat physical configuration the variable compensation impedance network 210 presents a compensation impedance that combines with the ground plane assembly impedance presented by the ground planes 202 and 204 to tune the mutual electromagnetic coupling between the ground plane assembly and the radiofrequency antenna to satisfy a predetermined operational tuning condition for the communications device in each of the physical configurations. For example, in one implementation, the mutual electromagnetic coupling between the ground plane assembly and the radiofrequency antenna is tuned to present a 50-ohm impedance to the radiofrequency antenna 208 in a frequency range of desirable operation (e.g., at least a portion of bandwidth between 500 MHz and 1.25 GHz).

Figure 3A:
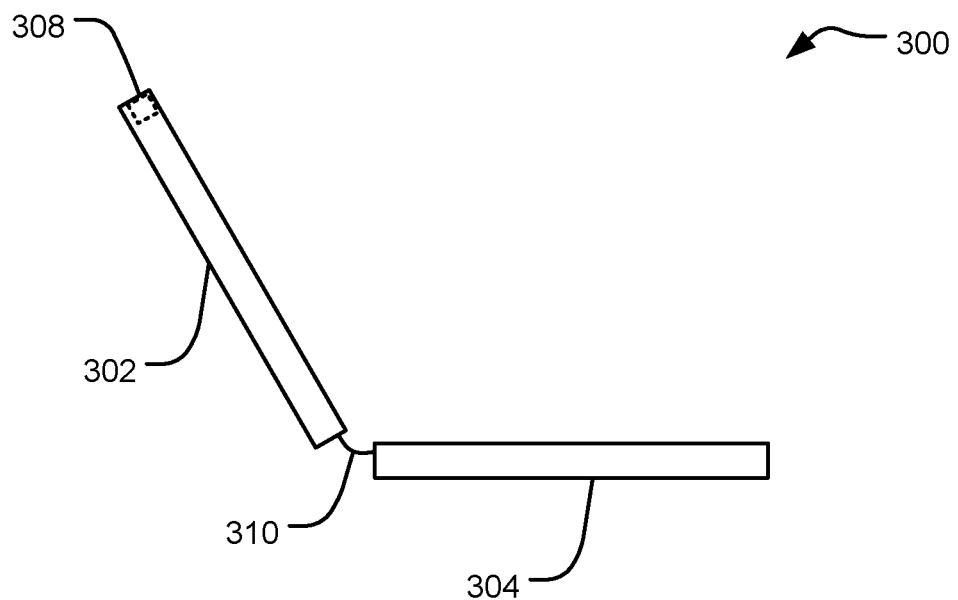
FIG. 3A illustrates an edge view of ground planes of an example communication device in an angled configuration.
Figure 3B:
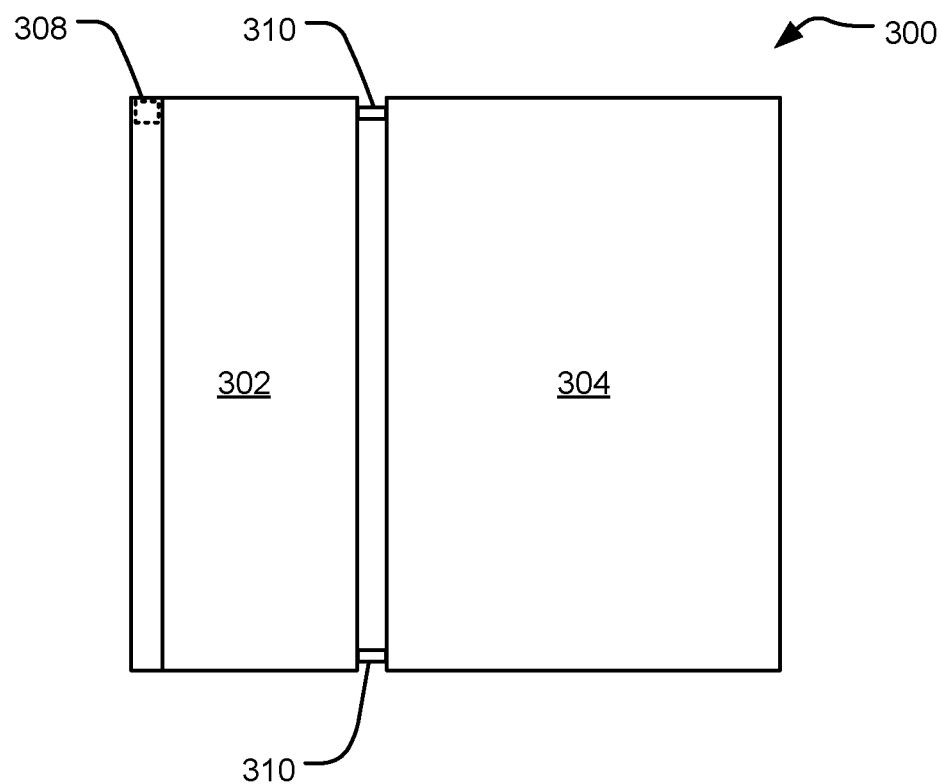
FIG. 3B illustrates a plan view of ground planes of an example communication device in an angled configuration.

FIG. 3A illustrates an edge view of ground planes 302 and 304 of an example communication device 300 in an angled configuration. FIG. 3B illustrates a plan view of ground planes 302 and 304 of an example communication device 300 in an angled configuration. In the illustrated views, the ground planes 302 and 304 represent a ground plane assembly, although other physical configurations of one or more ground planes can represent alternative ground plane assemblies. In both views, a radiofrequency antenna 308 is shown at a corner of and electrically coupled to the ground plane 302 via an electrical connection, although specific placement of the radiofrequency antenna 308 may vary.

In both views, the mutual electromagnetic coupling between the ground planes 302 and 304 and the radiofrequency antenna 308 is influenced by the mutual electromagnetic coupling between the ground planes 302 and 304 themselves (e.g., which changes as the relative positions and/or orientations of the ground planes 302 and 304 changes). Accordingly, the mutual electromagnetic coupling between the ground planes 302 and 304 in FIGS. 3A and 3B is different than the mutual electromagnetic coupling between the ground planes 202 and 204 in FIGS. 2A and 2B. Such changes in the mutual electromagnetic coupling between the ground planes in different physical configurations (e.g., flat in FIGS. 2A and 2B and angled in FIGS. 3A and 3B) change the ground plane assembly impedance presented to the radiofrequency antenna 308 and therefore change the tuning of the radiofrequency antenna 308.

A variable compensation impedance network 310 connects the ground planes 302 and 304 and compensates for changes in the ground plane assembly impedance presented to the radiofrequency antenna 308. For example, the angled physical configuration the variable compensation impedance network 310 presents a compensation impedance that combines with the ground plane assembly impedance presented by the ground planes 302 and 304 to tune the mutual electromagnetic coupling between the ground plane assembly and the radiofrequency antenna to satisfy a predetermined operational tuning condition for the communications device in each of the physical configurations. For example, in one implementation, the mutual electromagnetic coupling between the ground plane assembly and the radiofrequency antenna is tuned to present a 50-ohm impedance to the radiofrequency antenna 308 in a frequency range of desirable operation (e.g., at least a portion of bandwidth between 500 MHz and 1.25 GHz).

Figure 4A:
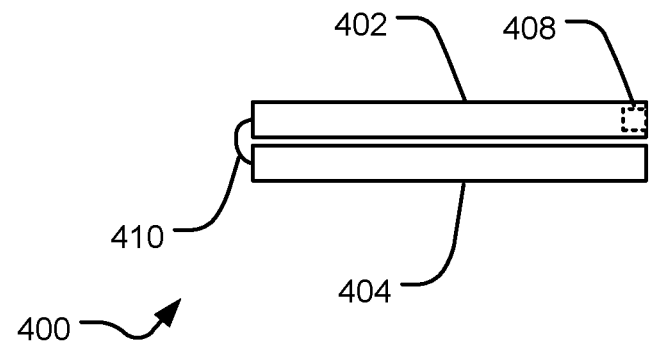
FIG. 4A illustrates an edge view of ground planes of an example communication device in a closed configuration.
Figure 4B:
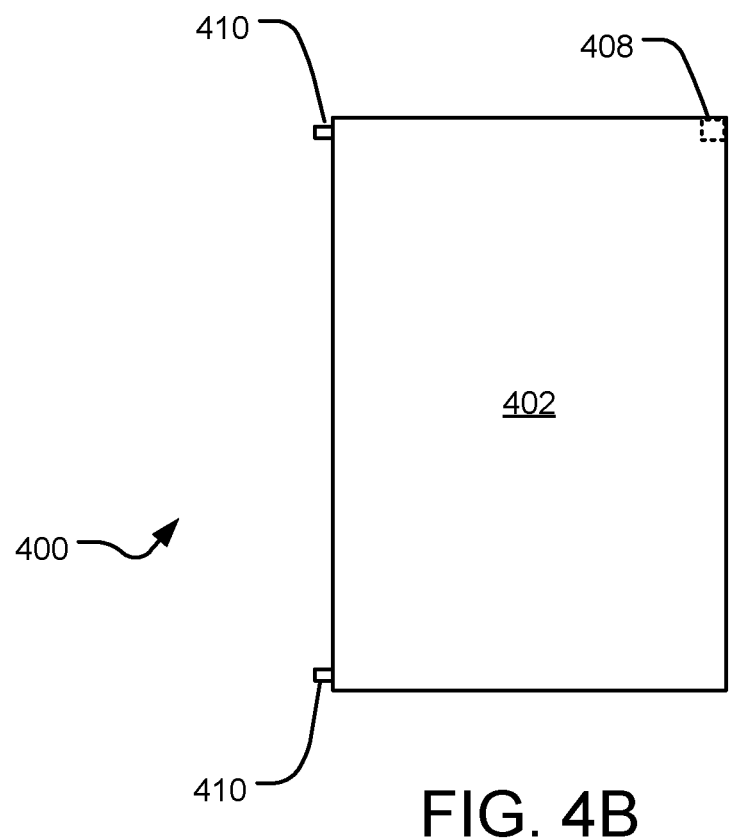
FIG. 4B illustrates a plan view of ground planes of an example communication device in a closed configuration.

FIG. 4A illustrates an edge view of ground planes 402 and 404 of an example communication device 400 in a closed configuration. FIG. 4B illustrates a plan view of ground planes 402 and 404 (only ground plane 402 is visible in FIG. 4B) of an example communication device 400 in a closed configuration. In the illustrated views, the ground planes 402 and 404 represent a ground plane assembly, although other physical configurations of one or more ground planes can represent alternative ground plane assemblies. In both views, a radiofrequency antenna 408 is shown at a corner of and electrically coupled to the ground plane 402 via an electrical connection, although specific placement of the radiofrequency antenna 408 may vary.

In both views, the mutual electromagnetic coupling between the ground planes 402 and 404 and the radiofrequency antenna 408 is influenced by the mutual electromagnetic coupling between the ground planes 402 and 404 themselves (e.g., which changes as the relative positions and/or orientations of the ground planes 402 and 404 changes). Accordingly, the mutual electromagnetic coupling between the ground planes 402 and 404 in FIGS. 4A and 4B is different than the mutual electromagnetic coupling between the ground planes 202 and 204 in FIGS. 2A and 2B and the mutual electromagnetic coupling between the ground planes 302 and 304 in FIGS. 3A and 3B. Such changes in the mutual electromagnetic coupling between the ground planes in different physical configurations (e.g., flat in FIGS. 2A and 2B, angled in FIGS. 3A and 3B, and closed in FIGS. 4A and 4B) change the ground plane assembly impedance presented to the radiofrequency antenna 408 and therefore change the tuning of the radiofrequency antenna 408.

A variable compensation impedance network 410 connects the ground planes 402 and 404 and compensates for changes in the ground plane assembly impedance presented to the radiofrequency antenna 408. For example, the angled physical configuration the variable compensation impedance network 410 presents a compensation impedance that combines with the ground plane assembly impedance presented by the ground planes 402 and 404 to tune the mutual electromagnetic coupling between the ground plane assembly and the radiofrequency antenna to satisfy a predetermined operational tuning condition for the communications device in each of the physical configurations. For example, in one implementation, the mutual electromagnetic coupling between the ground plane assembly and the radiofrequency antenna is tuned to present a 50-ohm impedance to the radiofrequency antenna 408 in a frequency range of desirable operation (e.g., at least a portion of bandwidth between 500 MHz and 1.25 GHz).

Figure 5:
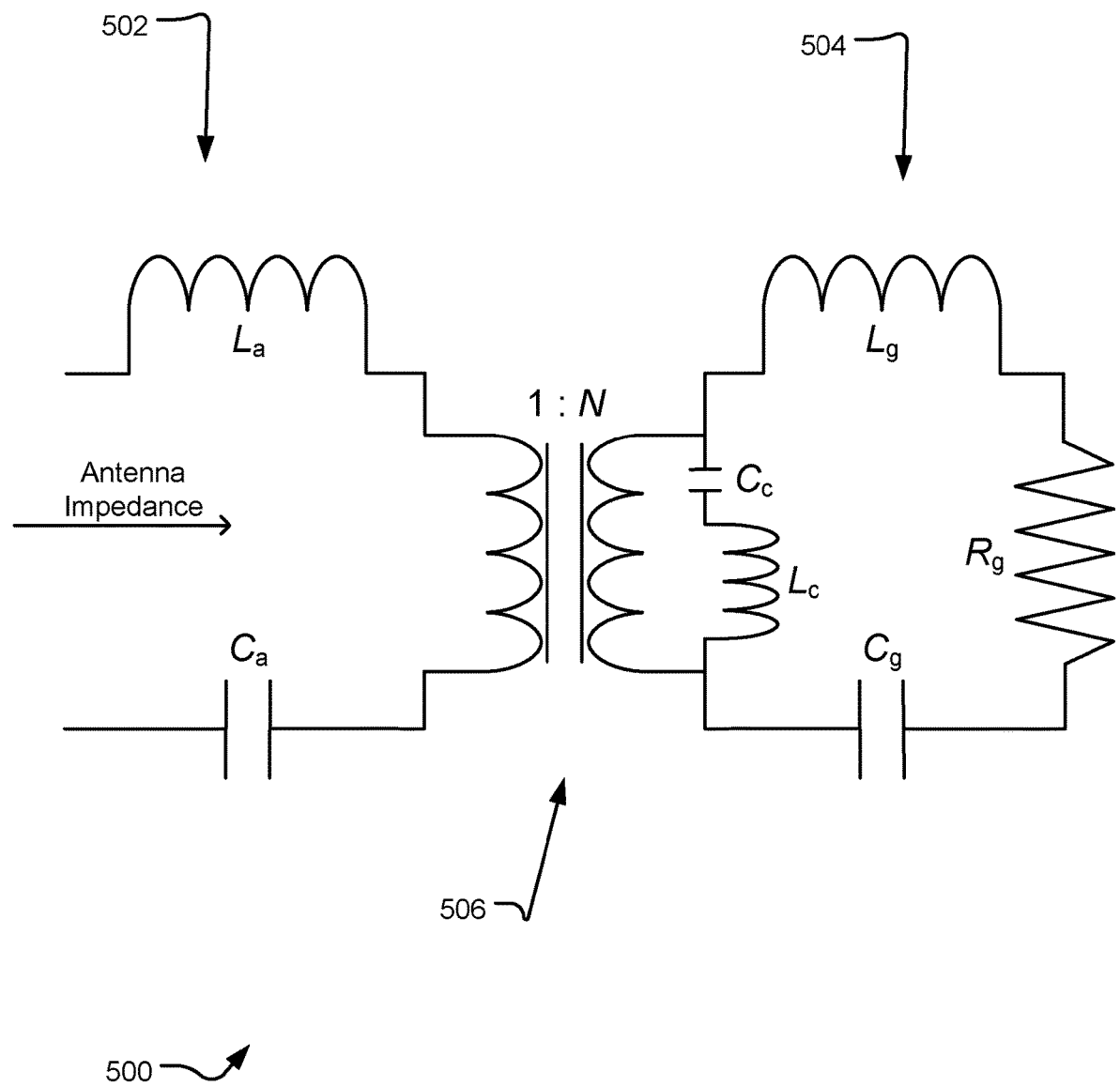
FIG. 5 illustrates a mutual coupling model depicting the mutual electromagnetic coupling 1:N between the antenna impedance and the variable ground plane assembly impedance in a communication device.

FIG. 5 illustrates a mutual coupling model 500 depicting the mutual electromagnetic coupling 1:N between an antenna impedance 502 and a variable ground plane assembly impedance 504 in a communication device. The antenna impedance 502 is modeled by the left side of a transformer 506 as including an inductance La and a capacitance Ca. The ground plane assembly impedance 502, which in some implementation is a combination of the impedance of multiple ground planes, is modeled by the right side of a transformer 506 as including an inductance Lg, a capacitance Cg, and a resistance Rg. As the ground plane assembly impedance 502 varies based on the current physical configuration of the ground planes (e.g., the relative position and/or orientation of multiple ground planes), changes to the physical configuration of the ground planes can change the mutual electromagnetic coupling between antenna and the ground plane assembly, thereby changing the tuning of the antenna.

To compensate for these changes, a variable compensation impedance network 508 including a variable capacitance Cc and a variable inductance Lc is added to the ground plane assembly. In one implementation, the variable compensation impedance network 508 connects two separate ground plane portions to influence the mutual electromagnetic coupling between the ground plane portions. In other implementations, the variable compensation impedance network 508 can interconnect more than two ground plane sections or be connected to compensate for other changes in ground plane assembly impedance. In one implementation, the variable compensation impedance values are determined during design, manufacturing, and/or assembly through manual or automated characterization (e.g., testing the amount that different physical ground plane configurations detune the antenna) and selected during operation to provide a compensation impedance that restores some or all of the tuning to the antenna. In another implementation, a modem in the communications device can detect that the antenna is detuned, invoking an automated corrective action that selects, over one or more iterations, a compensation impedance that provides the best (or an acceptable) tuning of the antenna. Other techniques may be employed, including combinations of the described implementations.

In one implementation, the mutual coupling model 500 reflects a mutual electromagnetic coupling relationship shown by:

$$N = \iiint \bar{E} \times \bar{J}^i d\tau$$

where N is the mutual electromagnetic coupling between the antenna and the ground plane assembly, E is the average electric field within the volume (τ) of the ground plane and $\bar{J}^i$ is the average current distribution within the volume of the ground plane that is induced by the antenna operation. As described above, the compensating capacitance and inductance values can be selected before and/or during operation to tune the ground plane resonance of the communications device to more closely match the antenna resonance. As the resonance frequency of the ground plane approaches the antenna resonance frequency, the coupling between the antenna and the ground plane approaches N=1.

By varying Cc and Lc according to different physical configurations in which the communication device can be set, Cc and Lc can be selected to combined with the different ground plane assembly impedances of each physical configuration such that the mutual electromagnetic coupling N between the antenna and the ground plane assembly can satisfy a predetermined operational tuning condition for the communications device in each of the physical configurations (e.g., to present a 50 ohm impedance to the antenna in a desirable frequency range between 500 MHz and 1.25 GHz). In one implementation, the mutual electromagnetic coupling N is optimized for each physical configuration, although any mutual electromagnetic coupling N that satisfies a predetermined operational tuning condition for the communications device in each of the physical configurations may suffice.

Figure 6:
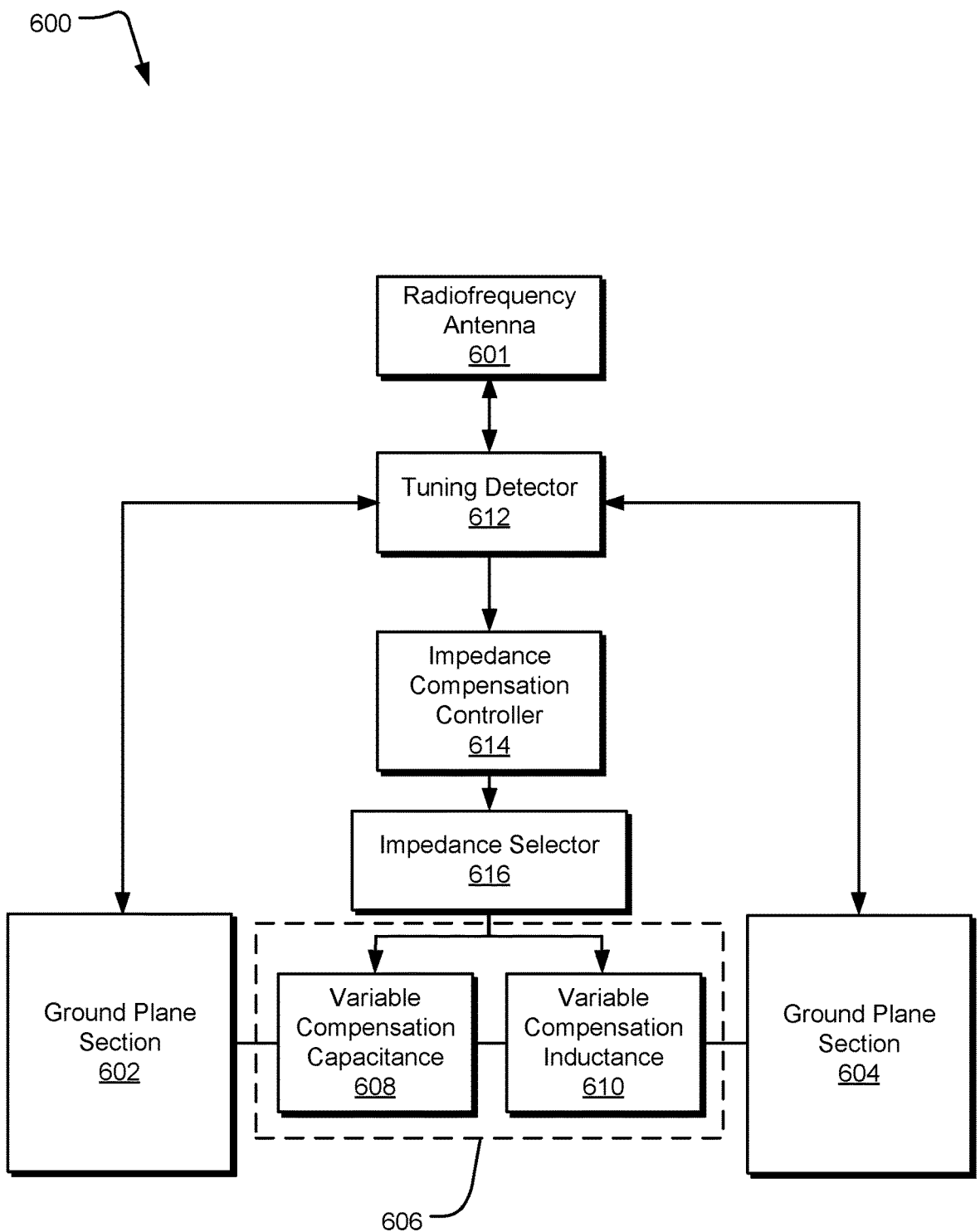
FIG. 6 illustrates example components of a communications device.

FIG. 6 illustrates example components of a communications device 600. The illustrated communications device 600 includes a radiofrequency antenna 601 and two ground plane sections 602 and 604 in a ground plane assembly, although other implementations may have a single ground plane or more than two ground plane sections. The ground plane sections 602 and 604 are connected by a variable compensation impedance network 606, which includes a variable compensation capacitance 608 and a variable compensation inductance 610. In one implementation, the variable compensation capacitance 608 includes a variable capacitor (e.g., software or hardware controlled), providing adjustable capacitance levels. In another implementation, the variable compensation capacitance 608 includes a network of switched capacitors (e.g., software or hardware controlled), providing switchable capacitance levels. In one implementation, the variable compensation inductance 610 includes a network of switched inductors (e.g., software or hardware controlled), providing switchable inductance levels.

In one implementation, a tuning detector 612 is electrically coupled to an impedance compensation controller 614 and the radiofrequency antenna 601 to detect detuning of the radiofrequency antenna 601 because of changes in ground plane assembly impedance (e.g., between or among different physical configurations of the communications device). For example, as the physical configuration of the communication device changes, the tuning of the radiofrequency antenna 601 in the frequency range of interest can begin to degrade. Such degradation can be detected by the tuning detector 612 (e.g., a coupler that can be implemented in a model of the communications device) and communicated to the impedance compensation controller 614, which determines some corrective action, such as adjusting the variable compensation capacitance 608 and the variable compensation inductance 610 to present a different value of ground plane assembly impedance. In another implementation, the tuning detector 612 may also detect both detuning and tuning events to provide feedback to the impedance compensation controller 614, thereby allowing the impedance compensation controller 614 to optimize the variable compensation capacitance 608 and the variable compensation inductance 610 and therefore the tuning of the radiofrequency antenna 601 in the frequency range of interest. Such tuning and/or detuning adjustments can be determined via look-up tables, algorithms, and other mechanisms to provide mutual electromagnetic coupling between the ground plane assembly and the radiofrequency antenna 601 that satisfies a predetermined operational tuning condition for the communications device in each of the supported physical configurations. Such look-up tables, algorithms, and other mechanisms may be stored in accessible memory or other storage or provided in circuitry.

In another implementation, the tuning detector 612 detects a detuning of the radiofrequency antenna 601 by proxy, e.g., by detecting changes in the physical configuration of the communications device. For example, in this implementation, different physical configurations can be mapped to different tuning parameters (e.g., different values of variable compensation capacitance 608 and/or the variable compensation inductance 610) to present different values of ground plane assembly impedance.

The impedance compensation controller 614 causes an impedance selector 616 to adjust the variable compensation capacitance 608 and/or the variable compensation inductance 610 of the variable compensation impedance network 606 to tuned levels. In one implementation, the impedance selector 616 adjusts the capacitance value of a variable capacitor (e.g., software or hardware controlled). In another implementation, the impedance selector 616 adjusts the capacitance value provided by a network of switched capacitors (e.g., software or hardware controlled). In one implementation, the impedance selector 616 adjusts the inductance value provided a network of switched inductors (e.g., software or hardware controlled).

Figure 7:
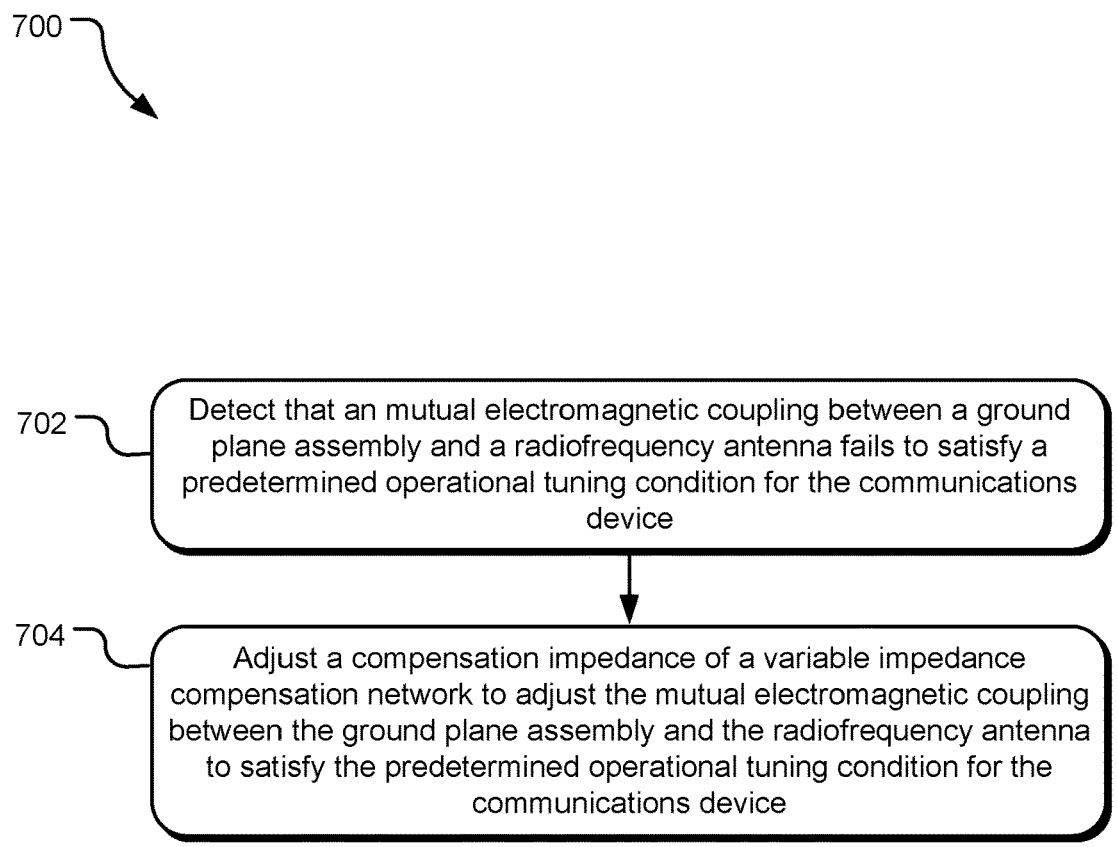
FIG. 7 illustrates example operations for providing variable ground plane tuning compensation.

FIG. 7 illustrates example operations 700 for providing variable ground plane tuning compensation. A detecting operation 702 detects that a mutual electromagnetic coupling between a ground plane assembly and a radiofrequency antenna fails to satisfy a predetermined operation tuning condition for a communications device. For example, the detecting operation 702 can detect a change in physical configuration (e.g., a flat configuration to an angled configuration). Each physical configuration may be mapped to different compensation impedance values, so a change in physical configuration may result in a detuning of the radiofrequency antenna in the communications device. In another example, the tuning of the radiofrequency antenna is monitored as a function of antenna performance. Other detection techniques may be employed.

An adjusting operation 704 adjusts a compensation impedance of a variable impedance network to adjust the mutual electromagnetic coupling between the ground plane assembly and the radiofrequency antenna to satisfy the predetermined operational tuning condition for the communications device. For example, an impedance compensation controller can cause an impedance selector to adjust the variable compensation capacitance and/or the variable compensation inductance of the variable compensation impedance network to tuned levels.

Figure 8:
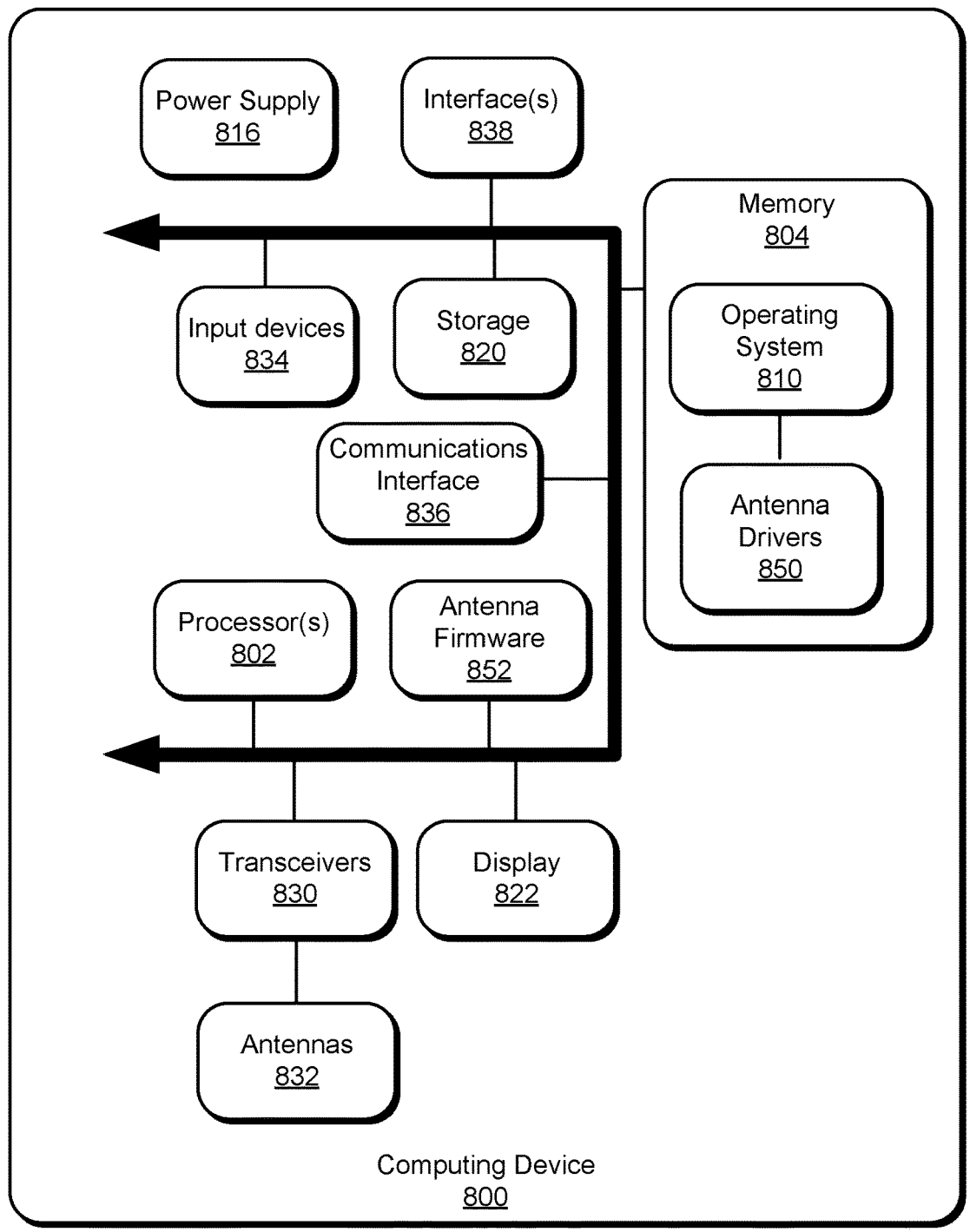
FIG. 8 illustrates an example computing device for use in providing variable ground plane tuning compensation.

FIG. 8 illustrates an example computing device 800 for use in providing variable ground plane tuning compensation. The computing device 800 may be a client device, such as a laptop, mobile device, desktop, tablet, or a server/cloud device. The computing device 800 includes one or more processor(s) 802, and a memory 804. The memory 804 generally includes both volatile memory (e.g., RAM) and non-volatile memory (e.g., flash memory). An operating system 810 resides in the memory 804 and is executed by the processor(s) 802.

In an example computing device 800, as shown in FIG. 8, one or more modules or segments, such as antenna drivers 850, an impedance compensation controller, a tuning detector, application modules, and other modules, are loaded into the operating system 810 on the memory 804 and/or storage 820 and executed by processor(s) 802. The storage 820 may be stored wireless communications parameters, tuning parameters, drivers, and other data and be local to the computing device 800 or may be remote and communicatively connected to the computing device 800.

The computing device 800 includes a power supply 816, which is powered by one or more batteries or other power sources and which provides power to other components of the computing device 800. The power supply 816 may also be connected to an external power source that overrides or recharges the built-in batteries or other power sources.

The computing device 800 may include one or more communication transceivers 830 which may be connected to one or more antenna(s) 832 to provide network connectivity (e.g., mobile phone network, Wi-Fi®, Bluetooth®) to one or more other servers and/or client devices (e.g., mobile devices, desktop computers, or laptop computers). The computing device 800 may further include a network adapter 836, which is a type of communication device. The computing device 800 may use the adapter and any other types of communication devices for establishing connections over a wide-area network (WAN) or local-area network (LAN). It should be appreciated that the network connections shown are exemplary and that other communications devices and means for establishing a communications link between the computing device 800 and other devices may be used.

The computing device 800 may include one or more input devices 834 such that a user may enter commands and information (e.g., a keyboard or mouse). These and other input devices may be coupled to the server by one or more interfaces 838 such as a serial port interface, parallel port, or universal serial bus (USB). The computing device 800 may further include a display 822, such as a touch screen display.

The computing device 800 may include a variety of tangible processor-readable storage media and intangible processor-readable communication signals. Tangible processor-readable storage can be embodied by any available media that can be accessed by the computing device 800 and includes both volatile and nonvolatile storage media, removable and non-removable storage media. Tangible processor-readable storage media excludes intangible communications signals and includes volatile and nonvolatile, removable and non-removable storage media implemented in any method or technology for storage of information such as processor-readable instructions, data structures, program modules or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the computing device 800. In contrast to tangible processor-readable storage media, intangible processor-readable communication signals may embody processor-readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

An example communications device provides variable ground plane tuning compensation. A radiofrequency antenna is configured to generate an electromagnetic field. A ground plane assembly is electrically coupled to the radiofrequency antenna and is configurable between a first physical configuration and a second physical configuration. Each of the physical configurations presents a ground plane assembly impedance to the electromagnetic field of the radiofrequency antenna. A variable impedance compensation network is electrically connected to the ground plane assembly. The variable impedance compensation network provides a compensation impedance for each of the physical configurations of the ground plane assembly. The compensation impedance of the variable impedance compensation network and the ground plane assembly impedance of each of the physical configurations of the ground plane assembly combine to tune mutual electromagnetic coupling between the ground plane assembly and the radiofrequency antenna to satisfy a predetermined operational tuning condition for the communications device in each of the physical configurations.

Another example communications device of any preceding device further includes a tuning detector configured to detect whether the mutual electromagnetic coupling between the ground plane assembly and the radiofrequency antenna satisfies the predetermined operational tuning condition for the communications device. An impedance compensation controller is coupled to the tuning detector and the variable impedance compensation network and configured to alter the compensation impedance to adjust the mutual electromagnetic coupling between the ground plane assembly and the radiofrequency antenna to satisfy the predetermined operational tuning condition for the communications device, responsive to detection that the mutual electromagnetic coupling between the ground plane assembly and the radiofrequency antenna fails to satisfy the predetermined operational tuning condition.

Another example communications device of any preceding device is provided wherein the ground plane assembly includes a first ground plane component and a second ground plane component and the tuning detector is configured to detect a change in relative positions of the first ground plane component and the second ground plane component from the first physical configuration, the change causing an impedance change in the ground plane assembly impedance between the first physical configuration to the second physical configuration.

Another example communications device of any preceding device is provided wherein the tuning detector is configured to detect a detuning of the radiofrequency antenna representing a failure to satisfy the predetermined operational tuning condition.

Another example communications device of any preceding device is provided wherein the variable impedance compensation network includes a dynamically adjustable capacitance component and a dynamically adjustable inductance component.

Another example communications device of any preceding device is provided wherein a capacitance value of the dynamically adjustable capacitance component and an inductance value of the dynamically adjustable inductance component in each of the physical configurations of the ground plane assembly are predetermined to satisfy the predetermined operational tuning condition for the communications device in each of the physical configurations.

Another example communications device of any preceding device is provided wherein the dynamically adjustable capacitance component includes a variable capacitor, and the impedance compensation controller is configured to alter the compensation impedance by switching a compensation capacitance level of the variable capacitor in the variable impedance compensation network.

Another example communications device of any preceding device is provided wherein the dynamically adjustable capacitance component includes a switched capacitor network, and the impedance compensation controller is configured to alter the compensation impedance by switching a compensation capacitance level of the switched capacitor network in the variable impedance compensation network.

Another example communications device of any preceding device is provided wherein the dynamically adjustable capacitance component includes a switched inductor network, and the impedance compensation controller is configured to alter the compensation impedance by switching a compensation inductor level of the switched inductor network in the variable impedance compensation network.

Another example communications device of any preceding device is provided wherein the ground plane assembly includes a first ground plane component and a second ground plane component. The first ground plane component is positioned relative to the second ground plane component in the first physical configuration differently than in the second physical configuration.

Another example communications device of any preceding device is provided wherein the ground plane assembly includes a first ground plane component and a second ground plane component electrically connected by the variable impedance compensation network.

Another example communications device of any preceding device is provided wherein the ground plane assembly includes a first ground plane component and a second ground plane component mechanically coupled by a hinge and electrically coupled by the variable impedance compensation network between the first ground plane component and the second ground plane component.

An example method of providing variable ground plane tuning compensation in a communications device includes detecting that a mutual electromagnetic coupling between a ground plane assembly and a radiofrequency antenna fails to satisfy a predetermined operational tuning condition for the communications device and adjusting a compensation impedance of a variable impedance compensation network to adjust the mutual electromagnetic coupling between the ground plane assembly and the radiofrequency antenna to satisfy the predetermined operational tuning condition for the communications device.

Another example method of any preceding method is provided wherein the ground plane assembly is electromagnetically coupled to the radiofrequency antenna in the communications device. The ground plane assembly is configurable between a first physical configuration and a second physical configuration. Each of the physical configurations presents a ground plane assembly impedance to an electromagnetic field generated by the radiofrequency antenna. The variable impedance compensation network is electrically connected to the ground plane assembly and structurally provides a different compensation impedance for each of the physical configurations of the ground plane assembly. The compensation impedance of the variable impedance compensation network and the ground plane assembly impedance of each of the physical configurations of the ground plane assembly combine to tune the mutual electromagnetic coupling between the ground plane assembly and the radiofrequency antenna to satisfy the predetermined operational tuning condition for the communications device in each of the physical configurations.

Another example method of any preceding method is provided wherein the ground plane assembly includes a first ground plane component and a second ground plane component, and the detecting operation includes detecting a change in relative positions of the first ground plane component and the second ground plane component from the first physical configuration, the change causing an impedance change from the first physical configuration to the second physical configuration.

Another example method of any preceding method is provided wherein the detecting operation includes detecting a detuning of the radiofrequency antenna representing a failure to satisfy the predetermined operational tuning condition.

Another example method of any preceding method is provided wherein the ground plane assembly includes a first ground plane component and a second ground plane component electrically connected by the variable impedance compensation network.

Another example method of any preceding method is provided wherein the ground plane assembly includes a first ground plane component and a second ground plane component mechanically coupled by a hinge and electrically coupled by the variable impedance compensation network between the first ground plane component and the second ground plane component.

One or more example tangible processor-readable storage media embody instructions for executing on one or more processors and circuits of a communications device a process for providing variable ground plane tuning compensation in the communications device. The process includes detecting that a mutual electromagnetic coupling between a ground plane assembly and a radiofrequency antenna fails to satisfy a predetermined operational tuning condition for the communications device and adjusting a compensation impedance of a variable impedance compensation network to adjust the mutual electromagnetic coupling between the ground plane assembly and the radiofrequency antenna to satisfy the predetermined operational tuning condition for the communications device.

Other one or more example tangible processor-readable storage media of any preceding media are provided wherein the ground plane assembly is electromagnetically coupled to the radiofrequency antenna in the communications device. The ground plane assembly is configurable between a first physical configuration and a second physical configuration. Each of the physical configurations presents a ground plane assembly impedance to an electromagnetic field generated by the radiofrequency antenna. The variable impedance compensation network is electrically connected to the ground plane assembly and structurally providing a different compensation impedance for each of the physical configurations of the ground plane assembly. The compensation impedance of the variable impedance compensation network and the ground plane assembly impedance of each of the physical configurations of the ground plane assembly combine to tune the mutual electromagnetic coupling between the ground plane assembly and the radiofrequency antenna to satisfy the predetermined operational tuning condition for the communications device in each of the physical configurations.

An example system of providing variable ground plane tuning compensation in a communications device includes means for detecting that a mutual electromagnetic coupling between a ground plane assembly and a radiofrequency antenna fails to satisfy a predetermined operational tuning condition for the communications device and means for adjusting a compensation impedance of a variable impedance compensation network to adjust the mutual electromagnetic coupling between the ground plane assembly and the radiofrequency antenna to satisfy the predetermined operational tuning condition for the communications device.

Another example system of any preceding system is provided wherein the ground plane assembly is electromagnetically coupled to the radiofrequency antenna in the communications device. The ground plane assembly is configurable between a first physical configuration and a second physical configuration. Each of the physical configurations presents a ground plane assembly impedance to an electromagnetic field generated by the radiofrequency antenna. The variable impedance compensation network is electrically connected to the ground plane assembly and structurally provides a different compensation impedance for each of the physical configurations of the ground plane assembly. The compensation impedance of the variable impedance compensation network and the ground plane assembly impedance of each of the physical configurations of the ground plane assembly combine to tune the mutual electromagnetic coupling between the ground plane assembly and the radiofrequency antenna to satisfy the predetermined operational tuning condition for the communications device in each of the physical configurations.

Another example system of any preceding system is provided wherein the ground plane assembly includes a first ground plane component and a second ground plane component, and the means for detecting includes means for detecting a change in relative positions of the first ground plane component and the second ground plane component from the first physical configuration, the change causing an impedance change from the first physical configuration to the second physical configuration.

Another example system of any preceding system is provided wherein the means for detecting includes means for detecting a detuning of the radiofrequency antenna representing a failure to satisfy the predetermined operational tuning condition.

Another example system of any preceding system is provided wherein the ground plane assembly includes a first ground plane component and a second ground plane component electrically connected by the variable impedance compensation network.

Another example system of any preceding system is provided wherein the ground plane assembly includes a first ground plane component and a second ground plane component mechanically coupled by a hinge and electrically coupled by the variable impedance compensation network between the first ground plane component and the second ground plane component.

Some implementations may comprise an article of manufacture. An article of manufacture may comprise a tangible storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain operation segment. The instructions may be implemented using any suitable high-level, low-level, object-oriented, visual, compiled, and/or interpreted programming language.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

What is claimed is:

1. A communications device providing variable ground plane tuning compensation, the communications device comprising:
    a radiofrequency antenna configured to generate an electromagnetic field;
    a ground plane assembly electrically coupled to the radiofrequency antenna, the ground plane assembly being configurable between a first physical configuration and a second physical configuration, each of the physical configurations presenting a ground plane assembly impedance to the electromagnetic field of the radiofrequency antenna; and
    a variable impedance compensation network electrically connected to the ground plane assembly, the variable impedance compensation network providing a compensation impedance for each of the physical configurations of the ground plane assembly, the compensation impedance of the variable impedance compensation network and the ground plane assembly impedance of each of the physical configurations of the ground plane assembly combining to tune mutual electromagnetic coupling between the ground plane assembly and the radiofrequency antenna to satisfy a predetermined operational tuning condition for the communications device in each of the physical configurations, wherein the ground plane assembly includes a first ground plane component and a second ground plane component and wherein the satisfying the predetermined operational tuning condition includes tuning the compensation impedance based at least in part on an angle between the first ground plane component and the second ground plane component.

2. The communications device of claim 1 further comprising:
    a tuning detector configured to detect whether the mutual electromagnetic coupling between the ground plane assembly and the radiofrequency antenna satisfies the predetermined operational tuning condition for the communications device; and
    an impedance compensation controller coupled to the tuning detector and the variable impedance compensation network and configured to alter the compensation impedance to adjust the mutual electromagnetic coupling between the ground plane assembly and the radiofrequency antenna to satisfy the predetermined operational tuning condition for the communications device, responsive to detection that the mutual electromagnetic coupling between the ground plane assembly and the radiofrequency antenna fails to satisfy the predetermined operational tuning condition.

3. The communications device of claim 2 wherein the tuning detector is configured to detect a change in relative positions of the first ground plane component and the second ground plane component from the first physical configuration, the change causing an impedance change in the ground plane assembly impedance between the first physical configuration to the second physical configuration.

4. The communications device of claim 2 wherein the tuning detector is configured to detect a detuning of the radiofrequency antenna representing a failure to satisfy the predetermined operational tuning condition.

5. The communications device of claim 2 wherein the variable impedance compensation network includes a dynamically adjustable capacitance component and a dynamically adjustable inductance component.

6. The communications device of claim 5 wherein a capacitance value of the dynamically adjustable capacitance component and an inductance value of the dynamically adjustable inductance component in each of the physical configurations of the ground plane assembly are predetermined to satisfy the predetermined operational tuning condition for the communications device in each of the physical configurations.

7. The communications device of claim 5 wherein the dynamically adjustable capacitance component includes a variable capacitor, and the impedance compensation controller is configured to alter the compensation impedance by switching a compensation capacitance level of the variable capacitor in the variable impedance compensation network.

8. The communications device of claim 5 wherein the dynamically adjustable capacitance component includes a switched capacitor network, and the impedance compensation controller is configured to alter the compensation impedance by switching a compensation capacitance level of the switched capacitor network in the variable impedance compensation network.

9. The communications device of claim 5 wherein the dynamically adjustable capacitance component includes a switched inductor network, and the impedance compensation controller is configured to alter the compensation impedance by switching a compensation inductor level of the switched inductor network in the variable impedance compensation network.

10. The communications device of claim 1 wherein the first ground plane component being positioned relative to the second ground plane component in the first physical configuration differently than in the second physical configuration.

11. The communications device of claim 1 wherein the first ground plane component and the second ground plane component are electrically connected by the variable impedance compensation network.

12. The communications device of claim 1 wherein the first ground plane component and the second ground plane component are mechanically coupled by a hinge and electrically coupled by the variable impedance compensation network between the first ground plane component and the second ground plane component.

13. The communications device of claim 1, wherein the satisfying the predetermined operational tuning condition includes substantially matching a resonance of the radiofrequency antenna and a resonance of the first ground plane component of the ground plane assembly.

14. A method of providing variable ground plane tuning compensation in a communications device, the method comprising:
    detecting that a mutual electromagnetic coupling between a ground plane assembly and a radiofrequency antenna fails to satisfy a predetermined operational tuning condition for the communications device; and
    adjusting a compensation impedance of a variable impedance compensation network to adjust the mutual electromagnetic coupling between the ground plane assembly and the radiofrequency antenna to satisfy the predetermined operational tuning condition for the communications device, wherein the ground plane assembly is electromagnetically coupled to the radiofrequency antenna in the communications device, the ground plane assembly being configurable between a first physical configuration and a second physical configuration, each of the physical configurations presenting a ground plane assembly impedance to an electromagnetic field generated by the radiofrequency antenna, the variable impedance compensation network being electrically connected to the ground plane assembly and structurally providing a different compensation impedance for each of the physical configurations of the ground plane assembly, the compensation impedance of the variable impedance compensation network and the ground plane assembly impedance of each of the physical configurations of the ground plane assembly combining to tune the mutual electromagnetic coupling between the ground plane assembly and the radiofrequency antenna to satisfy the predetermined operational tuning condition for the communications device in each of the physical configurations, wherein the ground plane assembly includes a first ground plane component, and wherein the satisfying the predetermined operational tuning condition includes substantially matching a resonance of the radiofrequency antenna and a resonance of the first ground plane component of the ground plane assembly.

15. The method of claim 14 wherein the ground plane assembly includes a second ground plane component, and the detecting operation comprises:
    detecting a change in relative positions of the first ground plane component and the second ground plane component from the first physical configuration, the change causing an impedance change from the first physical configuration to the second physical configuration.

16. The method of claim 14 wherein the detecting operation comprises:
    detecting a detuning of the radiofrequency antenna representing a failure to satisfy the predetermined operational tuning condition.

17. The method of claim 14 wherein the ground plane assembly includes a second ground plane component electrically connected to the first ground plane component by the variable impedance compensation network.

18. The method of claim 14 wherein the ground plane assembly includes a second ground plane component mechanically coupled to the first ground plane component by a hinge and electrically coupled by the variable impedance compensation network between the first ground plane component and the second ground plane component.

19. The method of claim 14, wherein the ground plane assembly includes a second ground plane component and wherein the satisfying the predetermined operational tuning condition includes tuning the compensation impedance based at least in part on an angle between the first ground plane component and the second ground plane component.

20. One or more tangible processor-readable storage media embodied with instructions for executing on one or more processors and circuits of a communications device a process for providing variable ground plane tuning compensation in the communications device, the process comprising:
    detecting that a mutual electromagnetic coupling between a ground plane assembly and a radiofrequency antenna fails to satisfy a predetermined operational tuning condition for the communications device; and
    adjusting a compensation impedance of a variable impedance compensation network to adjust the mutual electromagnetic coupling between the ground plane assembly and the radiofrequency antenna to satisfy the predetermined operational tuning condition for the communications device, wherein the ground plane assembly is electromagnetically coupled to the radiofrequency antenna in the communications device, the ground plane assembly being configurable between a first physical configuration and a second physical configuration, each of the physical configurations presenting a ground plane assembly impedance to an electromagnetic field generated by the radiofrequency antenna, the variable impedance compensation network being electrically connected to the ground plane assembly and structurally providing a different compensation impedance for each of the physical configurations of the ground plane assembly, the compensation impedance of the variable impedance compensation network and the ground plane assembly impedance of each of the physical configurations of the ground plane assembly combining to tune the mutual electromagnetic coupling between the ground plane assembly and the radiofrequency antenna to satisfy the predetermined operational tuning condition for the communications device in each of the physical configurations, wherein the satisfying the predetermined operational tuning condition includes tuning the radiofrequency antenna to transmit in a predetermined frequency range.

* * * * *